(12) United States Patent
Pettigrew et al.

(10) Patent No.: US 9,294,023 B2
(45) Date of Patent: Mar. 22, 2016

(54) METHOD OR SYSTEM FOR MINIMIZING THE IMPACT OF BACK EMF SAMPLING FOR MOTOR RESISTANCE PROFILING

(71) Applicant: Dynamic Controls, Riccarton, Christchurch (NZ)

(72) Inventors: Warren Gordon Pettigrew, Christchurch (NZ); Ian Palmer, Christchurch (NZ); Brendon David Hale, Christchurch (NZ)

(73) Assignee: Dynamic Controls, Riccarton, Christchurch (NZ)

( * ) Notice: Subject to any disclaimer, the term of this patent is extended or adjusted under 35 U.S.C. 154(b) by 222 days.

(21) Appl. No.: 13/964,284

(22) Filed: Aug. 12, 2013

(65) Prior Publication Data

US 2014/0042944 A1    Feb. 13, 2014

(30) Foreign Application Priority Data

Aug. 13, 2012  (NZ) ........................................ 601787

(51) Int. Cl.
| | | |
|---|---|---|
| H02P 6/18 | (2006.01) | |
| H02P 7/28 | (2006.01) | |
| H02P 6/14 | (2006.01) | |
| H02P 23/14 | (2006.01) | |
| H02P 31/00 | (2006.01) | |

(52) U.S. Cl.
CPC ............... *H02P 6/182* (2013.01); *H02P 6/147* (2013.01); *H02P 7/28* (2013.01); *H02P 23/14* (2013.01); *H02P 31/00* (2013.01)

(58) Field of Classification Search
CPC ...................................................... H02P 6/182
USPC .................................................... 318/400.34
See application file for complete search history.

(56) References Cited

U.S. PATENT DOCUMENTS

| | | | |
|---|---|---|---|
| 5,592,058 A * | 1/1997 | Archer et al. ............ | 318/400.09 |
| 6,072,652 A * | 6/2000 | Lee ................................. | 360/71 |
| 8,127,875 B2 * | 3/2012 | Mattes et al. ................ | 180/65.8 |
| 2009/0091133 A1 * | 4/2009 | Baker et al. ..................... | 290/34 |

FOREIGN PATENT DOCUMENTS

WO      WO 2012/044182      4/2012

* cited by examiner

*Primary Examiner* — Erick Glass
(74) *Attorney, Agent, or Firm* — Merchant & Gould P.C.

(57) ABSTRACT

A method of determining when to utilize a back EMF sampling method for motor resistance profiling in at least one DC motor, the method including the steps of analyzing a parameter prior to initializing the back EMF sampling method, and upon a determination that the analyzed parameter is within a defined range, initializing the back EMF sampling method.

14 Claims, 3 Drawing Sheets

METHOD OR SYSTEM FOR MINIMIZING THE IMPACT OF BACK EMF SAMPLING FOR MOTOR RESISTANCE PROFILING

This application claims benefit of Serial No. 601787, filed 13 Aug. 2012 in New Zealand and which application is incorporated herein by reference. To the extent appropriate, a claim of priority is made to the above disclosed applications.

TECHNICAL FIELD

The present invention relates to a method or system for minimizing the impact of back EMF sampling for motor resistance profiling.

BACKGROUND

In order to achieve good speed control of DC motors without resorting to using tacho-generators, encoders or resolvers, load compensation techniques can be used. This technique involves measuring the motor current, multiplying the current reading by a resistance value and adding this value to the demand signal, thereby compensating for the motor resistance induced drop of speed with increasing load.

Unfortunately for brushed DC motors, the resistance value is not constant and tends to increase as the current falls by as much as 3:1.

PCT patent application number PCT/NZ2011/000191 by the present applicant describes a technique of profiling the current dependant resistance term and using it to compensate the motor. It is advantageous to periodically update the profile because it can change with motor temperature or motor usage. In order to measure motor resistance to develop the profile, driving power to the motor must be turned off for a short period so that a no-load back EMF potential is allowed to establish at the motor terminals. This off-pulse, particularly at high loading, can cause a clicking noise and a torque pulse. In cases where the drive system is for power wheelchairs or mobility scooters, the click and pulse could be objectionable for users.

The clicking noise derives from the changes of motor iron dimensions due to changes of magnetisation. This effect is termed magneto restriction. Its effect is dependent on the construction of the motor, the type of iron used and the change of current in the motor.

Motor torque is proportional to the current flowing so torque pulse effects will be dependent on current flow, system inertia, speed and vehicle suspension design.

These effects cannot be eliminated, only reduced.

An object of the present invention is to provide a system and/or method that reduces the effects of the off-pulse during back EMF sampling, or to at least provide the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge in the art in any country. Any references discussed state the assertions of the author of those references and not the assertions of the applicant of this application. As such, the applicant reserves the right to challenge the accuracy and relevance of the references discussed.

SUMMARY

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements. It will be understood that this intended meaning also similarly applies to the terms mentioned when used to define steps in a method or process.

It will be understood that, when describing various integers, such as modules, components, elements etc., any integer may be constituted by a single integer or multiple integers.

According to one aspect, the present invention provides a method of determining when to utilise a back EMF sampling method for motor resistance profiling in at least one DC motor, the method including the steps of analysing a parameter prior to initialising the back EMF sampling method, and upon a determination that the analysed parameter is within a defined range, initialising the back EMF sampling method.

According to a further aspect, the present invention provides a method of controlling the operation of a back EMF sampling method for motor resistance profiling in at least one DC motor, the method including the steps of analysing a parameter during the back EMF sampling method, and upon a determination that the analysed parameter is within a defined range, re-establishing the drive to the DC motor.

According to a further aspect, the present invention provides a method of controlling the operation of a back EMF sampling method for motor resistance profiling in at least one DC motor, the method including the steps of applying one or more current and/or voltage profiles during the back EMF sampling method to control the back EMF voltage or motor current.

According to yet a further aspect, the present invention provides a method of controlling the operation of a back EMF sampling method for motor resistance profiling in at least one DC motor, the method including the steps of analysing a parameter within a pre-defined window of operation during the back EMF sampling method, and maintaining that parameter during the EMF sampling method.

BRIEF DESCRIPTION OF THE DRAWINGS

Embodiments of the present invention will now be described, by way of example only, with reference to the accompanying drawings, in which.

DESCRIPTION OF EMBODIMENTS

First Embodiment

Figure 1A:
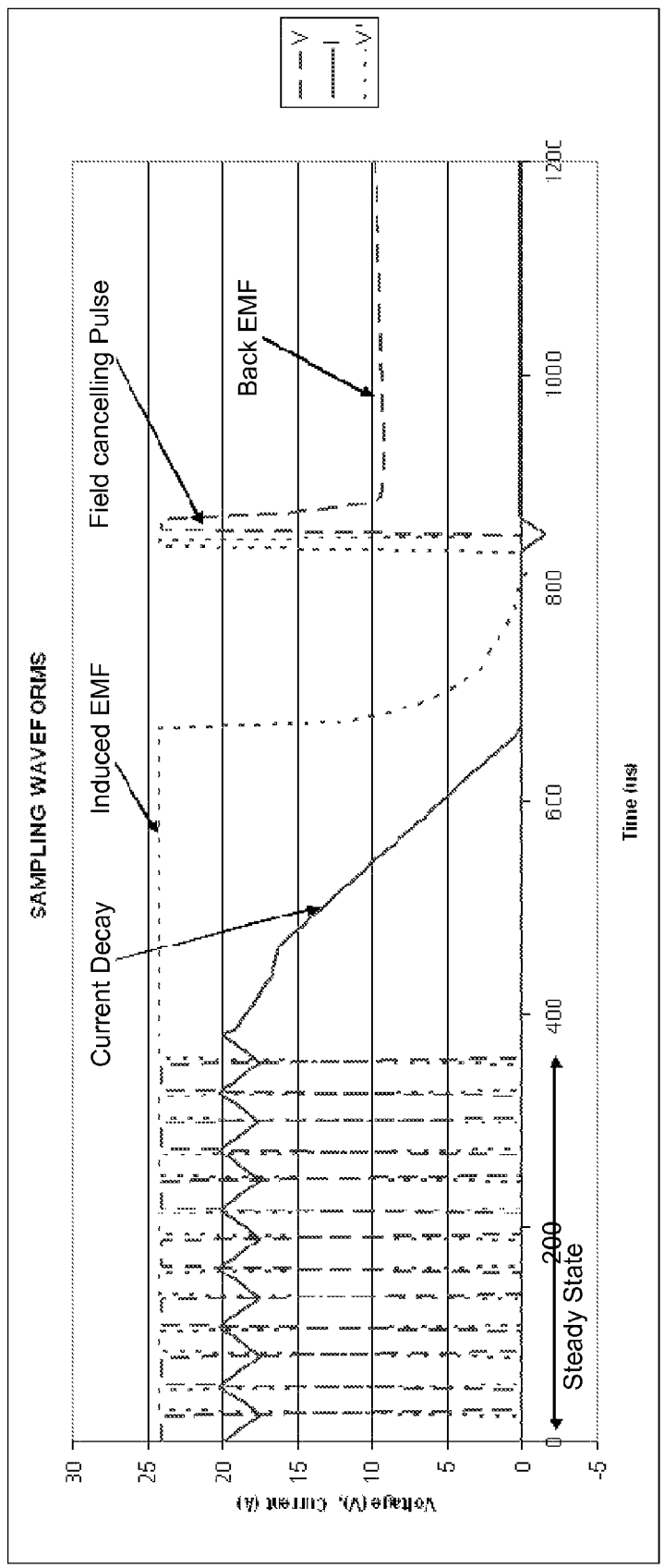
FIGS. 1A and 1B show voltage and current profiles according to an embodiment of the present invention.

The present invention applies to the control of either brushed or brushless DC motors. Preferably, the present invention applies to the control of these motors to drive power wheelchairs, mobility scooters and the like.

According to this first embodiment, several different examples are provided to show how the noise and/or torque pulses created during the back EMF measurement stage may be reduced.

According to a first example, the back EMF measurement may be taken at a time when the system determines that the current levels passing through the motor coil are below a defined threshold, i.e. the current levels are at a reduced level.

This technique reduces the change of torque and so improves the driving quality for the user. However, it also reduces the time in which a steady back EMF voltage may be established and so results in reduced accuracy.

According to one particular implementation, a current measurement module forms part of the control system and is adapted to measure the current passing through the motor. Any suitable type of current sensor may be used. A current comparator module is used to compare the measured current with a predetermined current value. The pre-determined current value is preferably a value that is less than the standard current used to drive the motor and is chosen to provide a reduced torque change during back EMF sampling. The pre-determined value may be stored in a memory device for use by the current comparator module. It will be understood that the measurement values may be mean calculation of values taken over a particular time period.

Upon detection that the measured current is below the desired limit, the back EMF sampling method may be activated. For example, a controller may activate the back EMF sampling method upon detection that the measured current is at a desired level.

According to a second example, the system is arranged to only activate the back EMF sampling method when the speed of the mobility vehicle is at or above a predetermined threshold value. The predetermined speed value may be stored in a memory device for use by a speed comparator module.

Similar to the first example, a measured value (this time speed rather than current) is taken and compared by the comparator with a predetermined value (speed) to determine if the measured value is at or above the predetermined value. If it is, a controller is arranged to activate or initiate the back EMF sampling method.

According to a third example, the system is arranged to minimize the time the current is not supplied during the back EMF sampling method. This is because the longer the off-time, the stronger the torque pulse effect. Therefore, the control system measures the motor terminal voltage during the EMF sampling steps and determines when that potential has reached a pre-determined value. The pre-determined value is a preferred steady state value chosen to minimise the effects of the torque pulse.

A motor terminal voltage measurement module forms part of the control system and is arranged to measure the terminal voltage during the EMF sampling method. A comparator module in the system may monitor or compare the measured terminal voltage to determine when the EMF potential has reached a steady state value. For example, a pre-determined steady state value may have previously been determined by taking appropriate measurements during test EMF sampling.

Alternatively, a more complex system may be used that utilises a rate change monitoring module to measure the rate of change of the back EMF to determine when the rate of change has reduced to a predetermined acceptable level.

In each case, the predetermined parameters may be stored and accessed from a memory module. The controller determines if the measured values match the predetermined values and reactivates the drive at that time in order to minimise the off time.

According to a fourth example, the system is arranged to re-establish the motor current as quickly as possible by way of implementing a suitable algorithm for applying the optimum voltage to the motor terminals. That is, during the off-time, motor current falls to zero at which time the steady-state back EMF is established. After recordings have been taken, it is important that the current is re-established as quickly as possible by applying full voltage momentarily to the motor terminals. An algorithm for determining the recovery voltage can be established and applied by the controller. It will be understood that numerous techniques are possible for establishing the algorithm. For example, through experimental measurements a suitable set of voltage and time values may be deduced and stored in a memory module in order to apply the correct voltage value to the motor terminals at the correct time.

A voltage controller may be controlled by the controller based on a predetermined set of voltage parameters in order to reduce the torque effect. It will be understood that the terminal voltage or motor current may be analysed to determine when to apply the defined voltage pulse across the motor terminals.

According to a fifth example, at the beginning of the EMF sampling method, the motor current may be forced to fall more quickly than it would if the motor were simply turned off. For example, a controller may be arranged to establish a reverse voltage on the motor for such time as required for the current to go to zero, or at least close to zero within a defined tolerance. This technique may require a current measurement module that is arranged to measure the motor current continuously during the off-pulse to assure correct timing and to also ensure that no negative current is established.

For example, the current measurement module may compare the measured current against a predetermined current value (for example zero, or close to zero) to activate a controller to switch off or adjust the reverse voltage applied to the motor at the correct time. Alternatively, the rate of change of the measured current value may be determined by a rate change monitoring module to determine the correct time for switching off or adjusting the reverse voltage applied to the motor.

An alternative to monitoring the motor current includes the monitoring of changes of terminal voltage induced by current changes. A particular signature may be generated when the current is reduced to zero, or close to zero. The controller may be adapted to detect these changes.

Alternatively, a predefined voltage or current profile (waveform) may be applied to the terminals of the motor in order to establish a defined reverse voltage across the motor terminals in order to reduce the motor current faster than it would naturally decay.

According to a sixth example, the motor current is monitored by a current monitoring module to determine when it approaches a pre-determined value, such as when it falls to zero for example. Upon detection that the current has reached its predetermined value, a short burst of power is applied to the motor by the controller. This burst of power reduces the amount of time it takes to recover the current, i.e. it reduces the time to ramp the motor drive current from substantially zero to the required drive value.

Alternatively, a predefined voltage or current profile (waveform) may be applied to the terminals of the motor in order to establish a burst of power to the motor in order to reduce the back EMF voltage recovery time.

According to a seventh example, the rate of change of motor current may be controlled by the controller to reduce the torque pulse effects. That is, the audible click volume can be modulated by decreasing the rate of fall and rise of the motor current. This also softens the torque pulse. It will be understood that this process may be optimised so that the slow rates of change do not excessively increase the off time.

Therefore, a predetermined set of rate of change or specific current values may be applied to the DC motor by the controller by way of applying a defined current profile to the motor.

According to an eighth example, the controller determines whether the motor resistance has changed over a number of measurement periods, and upon a determination that the motor resistance hasn't changed, the system may reduce the frequency of sampling.

For example, the controller may monitor the motor resistance values being measured and determine the percentage change over a period of time. Alternatively, the measured motor resistance values may be compared to a predetermined range to see if the motor resistance has moved out of that range. Upon detecting that the values haven't changed, the controller may reduce the frequency of sampling.

Alternatively, the controller may disable the motor resistance monitoring for a pre-determined period of time in order to reduce the noticeable effects to the user. After the expiry of the pre-determined period of time, the motor resistance may be measured again to see if it has significantly changed.

At any time when the motor resistance starts to change, the system may re-enable standard resistance monitoring in order to ensure that problems are still detected.

According to a ninth example, the learning time can be dramatically reduced if it is assumed that the resistance profile is fixed in shape and just moves up or down as a whole as the medium current resistance value changes. Testing proves that this approximation causes negligible degradation of system performance.

In practice low-current motor resistance measurements are noisy with noise reducing as currents increase making it beneficial to only make measurements at the higher end of the normal current operating range. Also it is better that testing is not performed at very high current as torque pulses are generated. In practice, the test range window can be adjusted to suit various makes and models of wheelchair. The profile position may then be normalized for the actual current the test was performed at. Precision is improved if multiple tests are averaged using a suitable algorithm. Tests must not be made at stall as these are unreliable.

The voltage and current chart in FIG. 1 shows a steady-state condition just prior to the off pulse. There is merit in forcing this steady-state condition to allow accurate and stable current and voltage readings to be taken during this period.

Figure 1B:
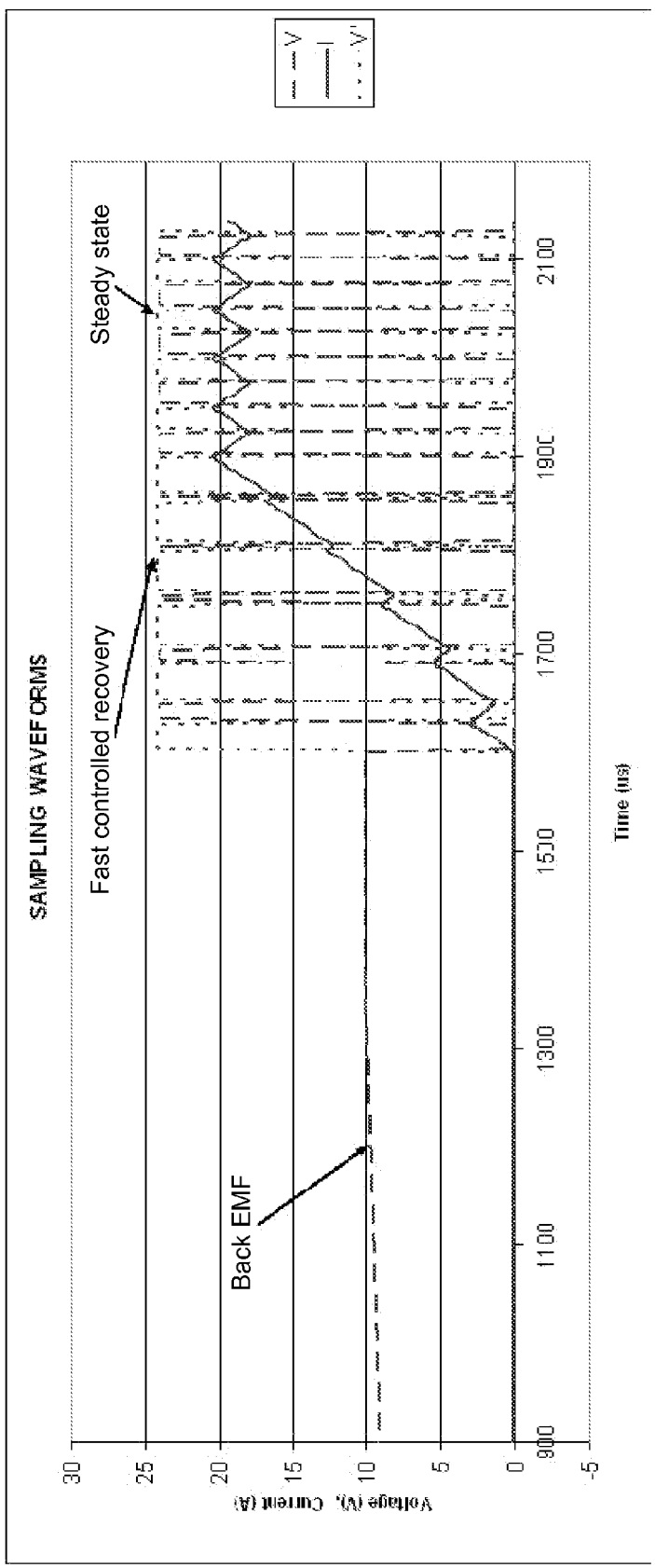

FIGS. 1A and 1B show voltage and current waveforms. Current decay of the current waveform is shown at around 500 microseconds. The induced EMF in the motor is also shown. This induced EMF is used to increase the rate of decay of the current. A field cancelling pulse is provided to force the back EMF to establish more quickly. The back EMF induced across the motor terminals is shown between approximately 900 and 1600 microseconds. Fast controlled recovery of the steady state operation of the motor is also indicated.

Therefore, the controller may utilise a window of operation in order to perform the test. The window of operation may be predetermined based on measurements taken during testing of the mobility vehicle. Further, the window of operation values may be adjusted during further tests after the initial testing.

Figure 2:
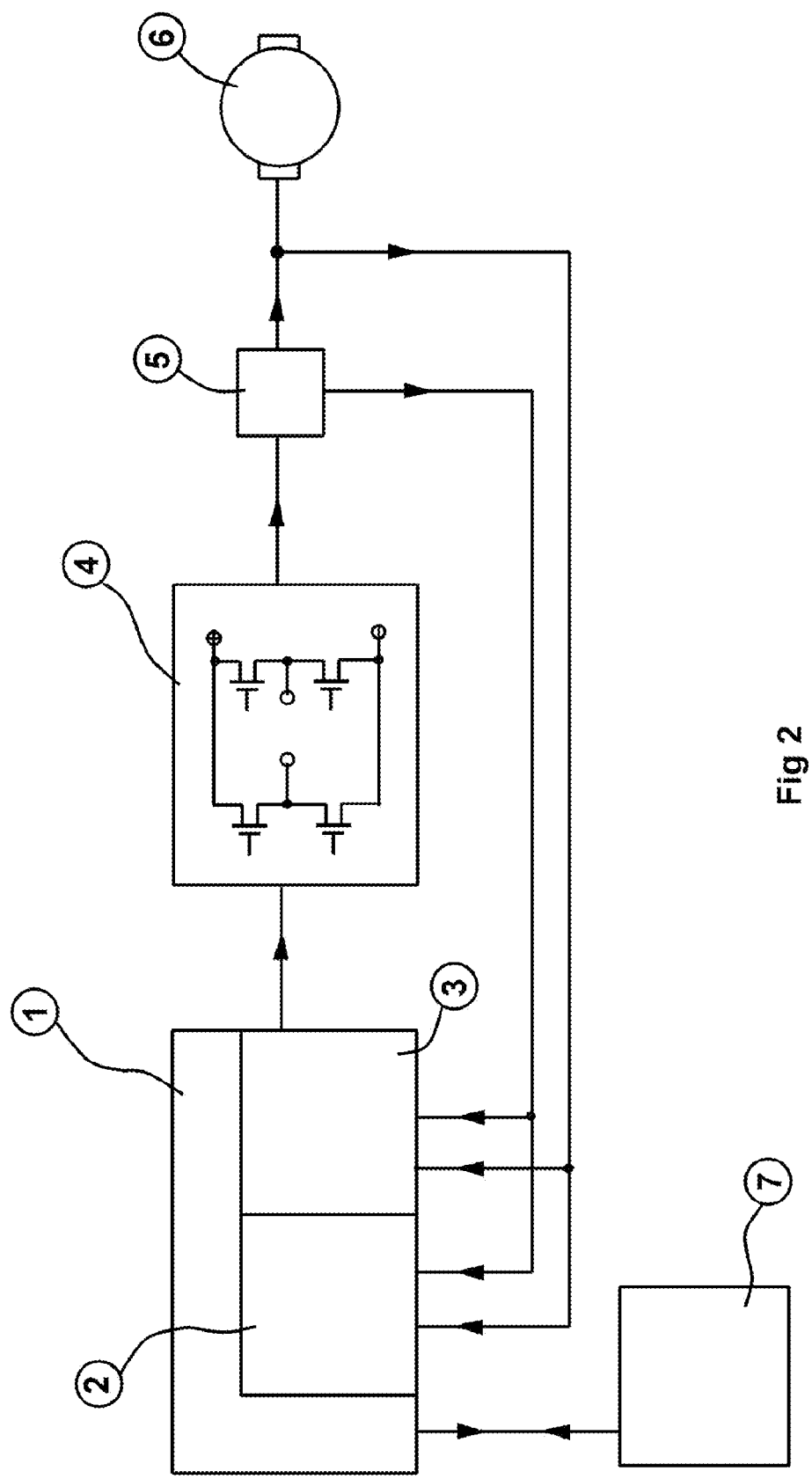
FIG. 2 shows a system block diagram according to an embodiment of the present invention.

FIG. 2 shows a system block diagram according to this embodiment. It includes a control system 1 with a rate change monitoring module 2 and comparator module 3. A drive bridge 4 provides an input to a current monitoring module 5 based on the output of the control system 1. The current monitoring module 5 provides a current feedback loop back to the control system 1. The motor 6 is driven by the output of the current monitoring module 5. A memory module 7 is in communication with the control system 1 to provide stored data including predetermined current and/or voltage values and profiles.

It will be understood that various techniques described above may be combined. Further, it will be understood that various techniques above may be optimised for use with other techniques to ensure that the effects of one technique are not to the detriment of other techniques.

It will be understood that the embodiments of the present invention described herein are by way of example only, and that various changes and modifications may be made without departing from the scope of invention.

What is claimed:

1. A method of determining when to utilise a back EMF sampling method for motor resistance profiling, the method including: analysing a parameter of a direct-current (DC) motor of a drive system for a mobility vehicle prior to initialising the back EMF sampling method, and upon a determination that the analysed parameter is within a defined range, initialising the back EMF sampling method to profile the resistance of the DC motor.

2. The method of claim 1, wherein the parameter is one or more of a current flowing through the motor, speed of a mobility vehicle, determined motor resistance.

3. The method of claim 2, wherein when the parameter is current flowing through the motor the method further includes the steps of determining when the current is below a predetermined level, and initialising the back EMF sampling method upon a positive determination.

4. The method of claim 2, wherein when the parameter is speed of the mobility vehicle, the method further includes the steps of determining when the speed is above a predetermined level, and initialising the back EMF sampling method upon a positive determination.

5. The method of claim 2, wherein when the parameter is the determined motor resistance, the method further includes the steps of monitoring the variation of the motor resistance against a predetermined level, and initialising the back EMF sampling method based on the monitoring step.

6. A method of controlling the operation of back EMF sampling for motor resistance profiling, the method including: analyzing, during back EMF sampling to profile the resistance of a direct-current (DC) motor of a drive system for a mobility vehicle, a parameter of the DC motor, and upon a determination that the analysed parameter is within a defined range, re-establishing a drive to the DC motor.

7. The method of claim 6 wherein the parameter is one of the motor terminal voltage and motor current.

8. The method of claim 7 further including the steps of reducing the current off time based on the analysed parameter.

9. The method of claim 7 further including the steps of re-establishing the motor current quickly by applying a pre-defined voltage potential across the motor based on the analysed parameter.

10. A method of controlling the operation of back EMF sampling for motor resistance profiling, the method including: applying one or more current and/or voltage profiles during back EMF sampling of a direct-current (DC) motor of a drive system for driving a mobility vehicle to profile a resistance of the DC motor; and using the profiled resistance of the DC motor to control the back EMF voltage or motor current.

11. The method of claim 10 further including the step of establishing a reverse voltage across the motor based on the resistance profile to reduce the motor current faster than it would naturally decay.

12. The method of claim 10 further including the step of applying a burst of power to the motor based on the resistance profile to reduce the back EMF voltage recovery time.

13. The method of claim 10 further including the step of controlling the rate of change of current based on the profile.

14. A method of controlling the operation of back EMF sampling for motor resistance profiling, the method including: analysing a parameter of a direct-current (DC) motor of a drive system for a mobility vehicle within a pre-defined window of operation during back EMF sampling of the DC motor to profile a resistance of the DC motor, and maintaining that parameter during the back EMF sampling.

* * * * *